United States Patent [19]
Birge, II et al.

[11] 3,946,678
[45] Mar. 30, 1976

[54] CONVERTIBLE VEHICLE PLATFORM AND SHELF APPARATUS
[75] Inventors: Jackson P. Birge, II; David A. Bradshaw, both of Oklahoma City, Okla.
[73] Assignee: Progressive Engineering Design, Edmond, Okla.
[22] Filed: Jan. 30, 1975
[21] Appl. No.: 545,595

[52] U.S. Cl. .................. 108/44; 5/9 R; 108/11; 296/23 MC; 296/65 R; 296/69; 297/119
[51] Int. Cl.² .................. B60P 3/32; A47B 85/04
[58] Field of Search .............. 108/44, 12, 11, 13, 15, 108/17, 18, 19, 59; 297/92, 119, 122, 118; 296/23 R, 23 MC, 3, 69, 65 R; 5/9 R, 5, 8

[56] References Cited
UNITED STATES PATENTS

| 989,718 | 4/1911 | McKay | 297/129 |
|---|---|---|---|
| 1,601,990 | 10/1926 | Wann | 296/3 |
| 3,022,976 | 2/1962 | Zia | 296/65 R |
| 3,058,776 | 10/1962 | Collum | 297/122 |
| 3,246,347 | 4/1966 | Mason | 5/9 R |
| 3,282,625 | 11/1966 | Logan | 5/9 R |
| 3,312,984 | 4/1967 | Hagstrom | 5/9 R |
| 3,471,195 | 10/1969 | Rowe | 297/119 X |
| 3,659,894 | 5/1972 | Dodgen | 296/23 MC |
| 3,874,009 | 4/1975 | Nosaka et al. | 5/9 R |

Primary Examiner—James T. McCall
Attorney, Agent, or Firm—Dunlap, Codding & McCarthy

[57] ABSTRACT

A convertible platform and shelf apparatus for a van like vehicle having a compartment comprising a frame strut assembly connected to the inside walls of the compartment and a plurality of utility shelf assemblies that have a plurality of hinged together planar members selectively positionable in rigid coplanar relationship. The shelf assemblies are detachably connectable to the frame strut assembly to form utility areas usable as tables, beds, storage areas or for personnel back support. Retractable leg assemblies are provided for partial support when the shelf assemblies are used as tables. Also provided is a platform assembly that selectively folds into a reversable facing seat or into an elevated platform to serve as a bed or the like.

9 Claims, 15 Drawing Figures

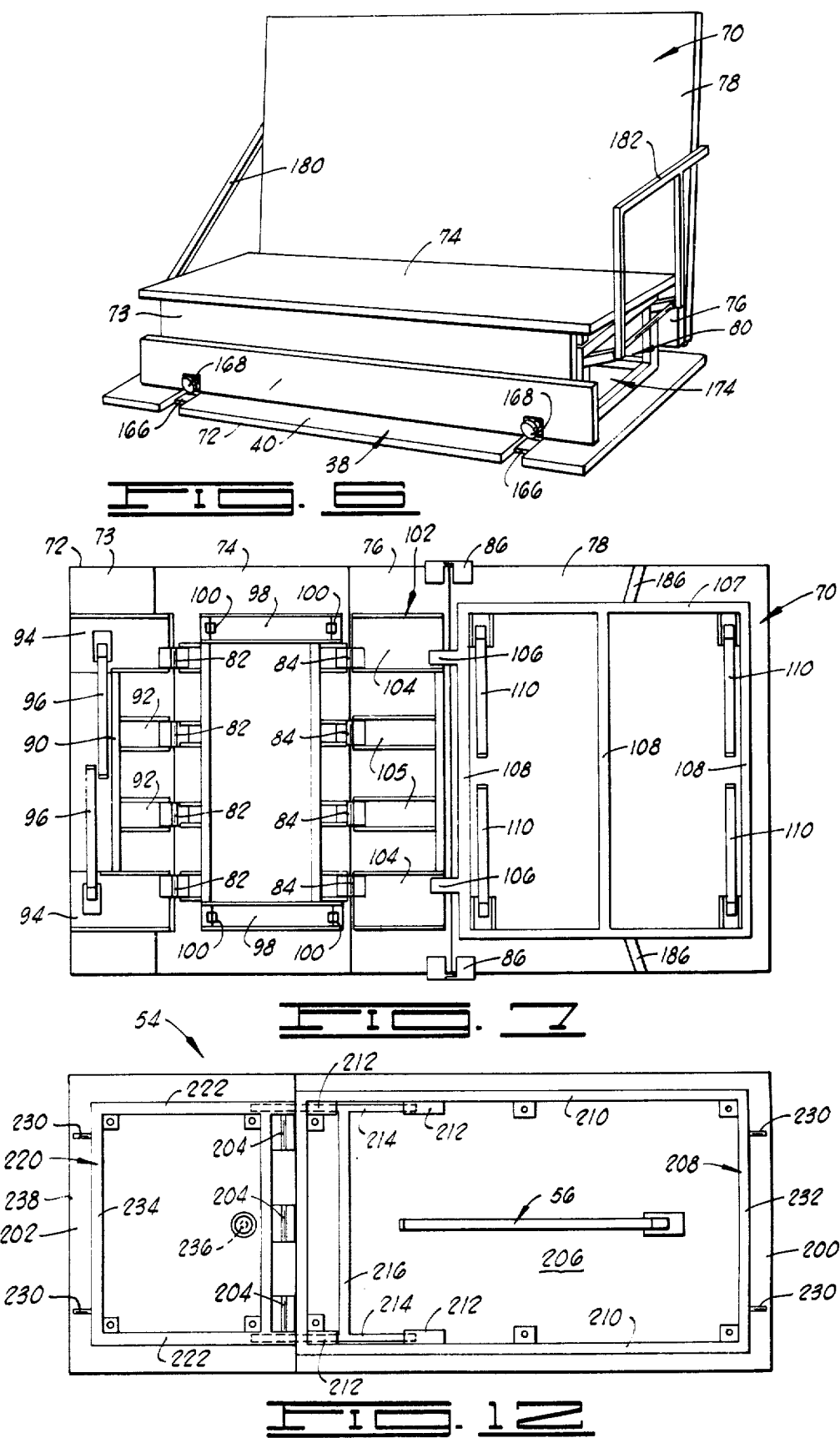

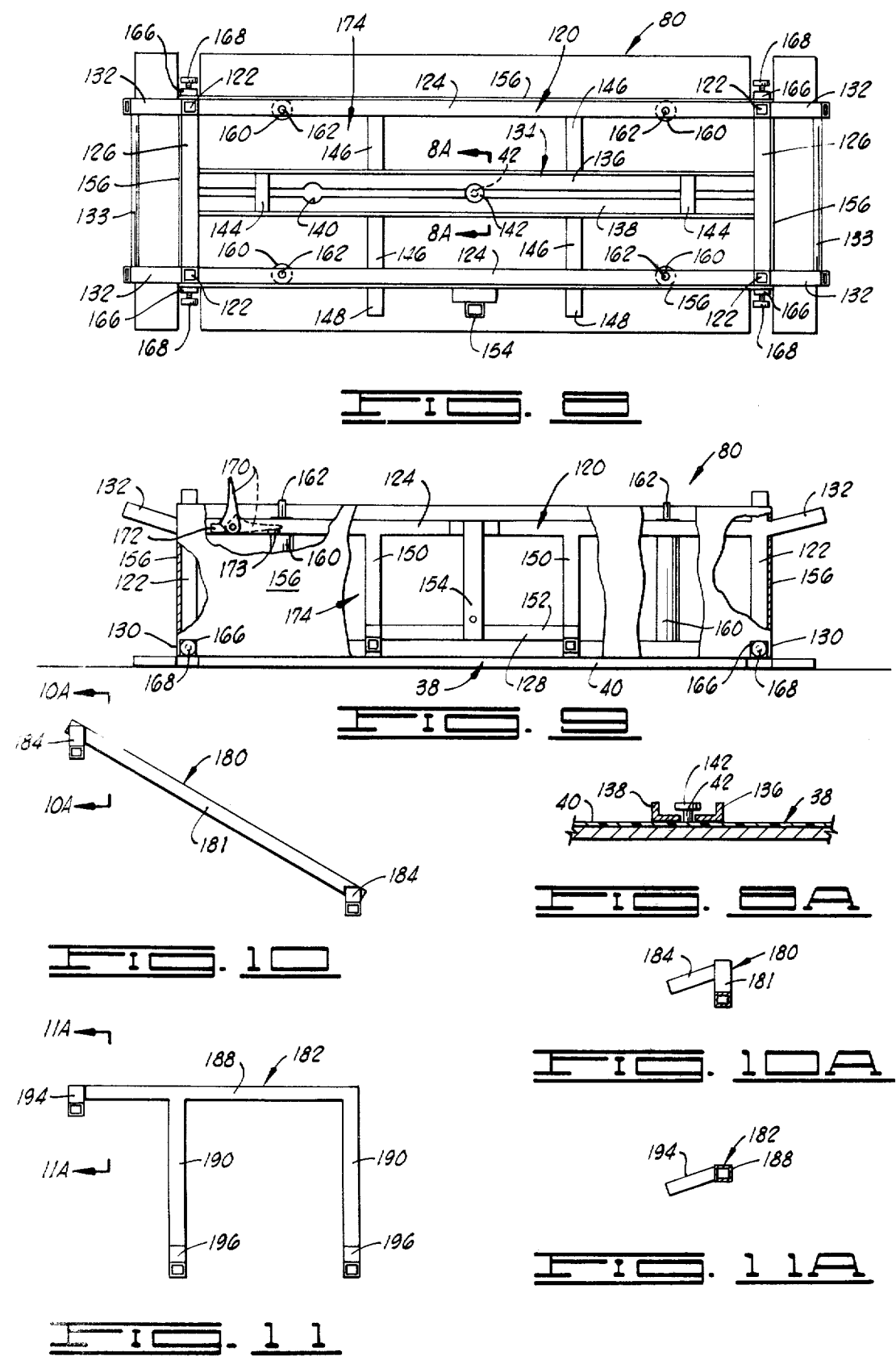

CONVERTIBLE VEHICLE PLATFORM AND SHELF APPARATUS

BACKGROUND OF THE INVENTION

1. Field of Invention

The present invention relates generally to the field of vehicle accommodations, and more particularly but not by way of limitation, to an improved means for converting a van like vehicle into a recreational vehicle.

2. Description of the Prior Art

There is a widely increasing interest in this country and abroad in camping activities. By camping activies, we mean those activities by groups of persons involving travel into generally less populated areas for the purpose of partaking of the beauties and natural attributes of field, forest and stream. In support of such activities, there has arisen the creation of the recreational vehicle, a term covering a wide assortment of vehicles that provide travel, shelter and survival provisions for the camping participants. Such recreational vehicles vary widely in style and size, ranging from simple trailers pulled by a car or the like to fully powered, mobile homes. Indeed, civilization is hardly left behind by such conveniences as television and air conditioning facilities carried by some of the more elegant mobile recreational vehicles.

One problem encountered by the camping enthusiast is that which is presented by what to do with the recreational vehicle during periods of time when the vehicle is not in use. Many recreational vehicle owners have found that multi-purpose vehicles convertible from camping use to a more general use, more adequately fit their budgets and desires. This solution provides a vehicle that can be used for such purposes as personnel transportation, an open interior truck during work requirements, and one which is adaptable for camping activities as needed.

A very popular vehicle that serves the triple capability above mentioned is the van vehicle, a small truck somewhat larger than a stationwagon automobile, and yet large enough to be used for camping activities when converted for that purpose. Although this type of vehicle has been available commercially from most major automobile manufacturers for many years, van vehicles were usually puchased by business concerns for such purposes as small article delivery and the like. Today's versions of the long known van is usually designed along the same style as yesteryear's models, with the exceptions of updatings found in the mechanical equipment of the van vehicles, and today's models usually have an abundance of window area so as to provide nearly wrap-around vision.

Surprisingly little prior art deals with the problem of converting a van like vehicle for the purposes above discussed. The patent to Logen, U.S. Pat. No. 3,282,685, does disclose a convertible seat and bed apparatus permanently mounted in a van vehicle. Also, the patent to Mortrude, U.S. Pat. No. 3,184,766, teaches an arrangement of benches that are convertible to make into beds; however, these for the most part are permanently connected to the vehicle.

There is a need for an improved convertible platform and shelf apparatus that will easily and quickly convert a van like vehicle from a truck into a large capacity personnel carrier or a recreational vehicle.

SUMMARY OF THE INVENTION

Accordingly, the principle object of the present invention is the provision of an apparatus to easily and quickly convert a van like vehicle into a personnel carrier or a recreational vehicle.

Another object of the present invention is to provide a convertible platform and shelf apparatus for a van like vehicle that is arrangeable in a variety of storage, sleeping and seating areas.

Another object of the present invention is to provide a convertible platform and shelf apparatus for a van like vehicle arrangeable in many horizontal platforms for personnel sleeping or storage areas.

Another object of the present invention is to provide a convertible platform and shelf apparatus for a van like vehicle that is arrangeable to provide maximum seating capability.

Another object of the present invention is to provide a convertible platform and shelf apparatus for a van like vehicle that is completely removable to provide maximum space for general non-recreational usage.

Another object of the present invention is to provide a convertible platform and shelf apparatus for a van like vehicle that is arrangeable by the labor of a single, unassisted individual.

Another object of the present invention is to provide a convertible platform and shelf apparatus for a van like vehicle that lends itself to ease of upholstering for appointment in simple or luxurious styles.

Another object of the present invention is to provide a convertible platform and shelf apparatus for a van like vehicle that is light weight and therefore adds a minimum of weight to the vehicle.

Another object of the present invention is to provide a convertible platform and shelf apparatus for a van like vehicle that offers a simplicity of design and affords economy in manufacture.

Another object of the present invention is to provide a convertible platform and shelf apparatus for a van like vehicle that requires minimal care and upkeep during the life of the vehicle.

Another object of the present invention is to provide a convertible platform and shelf apparatus for a van like vehicle that is easily and quickly transferrable from one van like vehicle to another.

Another object of the present invention is to provide a convertible platform and shelf apparatus for a van like vehicle that has hidden but easily accessible storage for small items.

Other objects, features and advantages of the present invention will be apparent to those skilled in the art from the following detailed description of presently preferred embodiments of the invention given for the purpose of disclosure when taken in conjunction with the accompanying drawings.

BRIEF DESCRIPTION OF THE DRAWINGS

FIG. 6 is a semi-diagrammatical isometric view of the convertible platform and shelf apparatus of the present invention.

FIG. 7 is a view of the underside of the convertible platform and shelf apparatus of the present invention.

FIG. 8 is a top view of the seat base assembly of the convertible platform and shelf apparatus of the present invention.

FIG. 8A is a cross sectional view taken at 8A—8A in FIG. 8.

FIG. 9 is an elevational view of the seat base assembly of FIG. 8.

FIGS. 10 and 11 are views of alternative arm rests used with the convertible platform assembly of the present invention.

FIG. 10A is a cross sectional view taken at 10A—10A in FIG. 10, and FIG. 11A is a cross sectional view taken at 11A—11A in FIG. 11.

FIG. 12 is a bottom view of one of the shelf assemblies of the present invention.

DESCRIPTION OF THE PREFERRED EMBODIMENT

Figure 1:
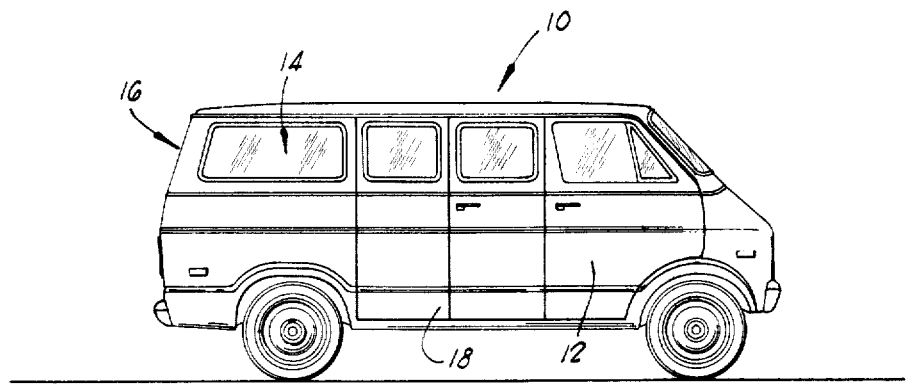
FIG. 1 is a side view of a van vehicle.

Referring to the drawings, and more particularly to FIG. 1, a van vehicle 10 is shown in side view. The vehicle 10 is generally similar to a stationwagon automobile with the exception that it is somewhat larger and is classified as a small truck. Near the front of the vehicle is a passenger door 12, behind which is housed an interior compartment 14 having interior walls and a floor, the compartment being usable for a variety of small to relatively large items of commerce. Located at the rear of the vehicle is a set of rear doors 16, and at the side of the vehicle, a set of side doors 18. The van vehicle 10 and those similar thereto are well suited for the convertible platform and shelf apparatus for the present invention, offering a relatively large interior compartment 14 having very good accessibility.

Figure 2:
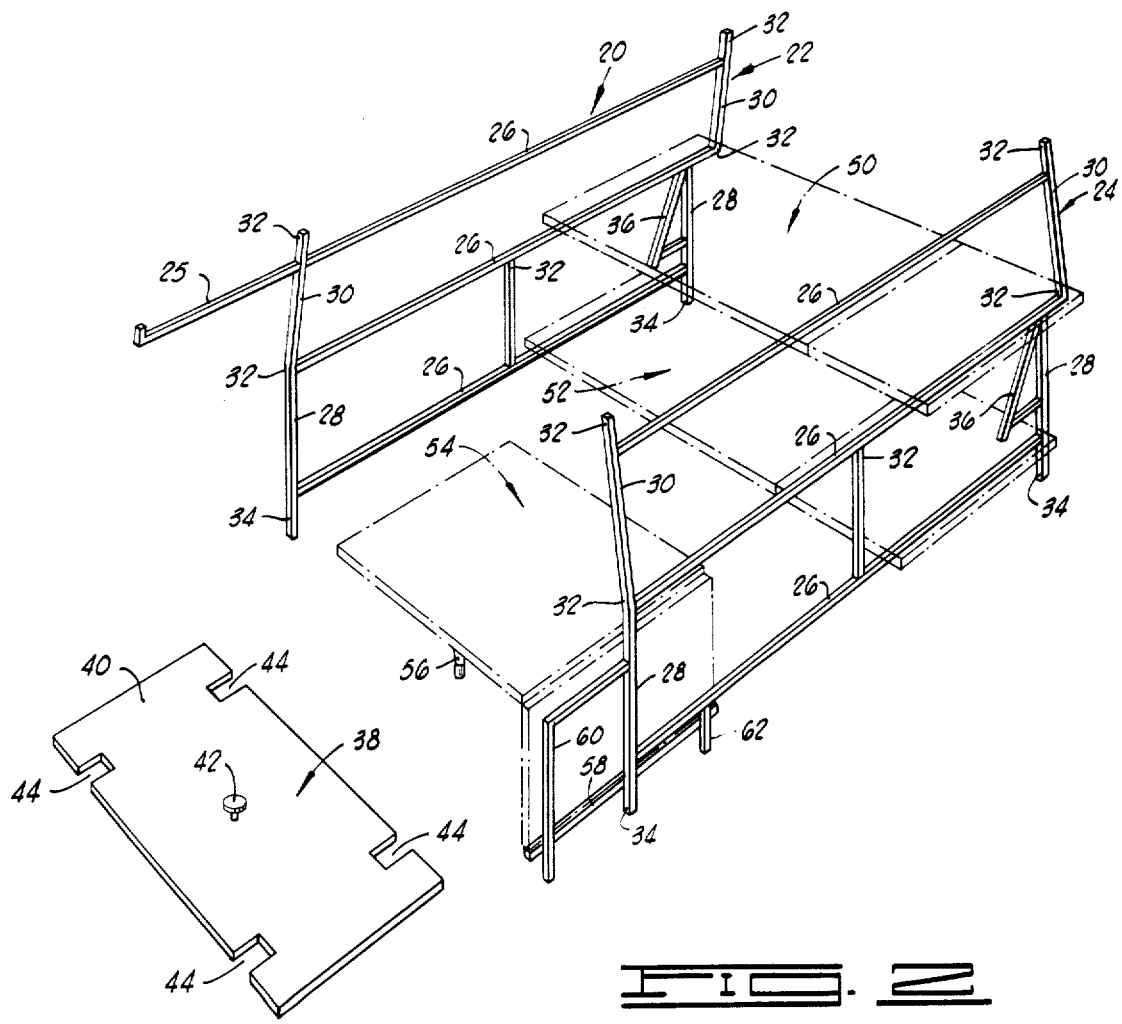
FIG. 2 is an isometric view of the frame strut assembly of the present invention.

FIG. 2 is a semi-detailed isometric view of the frame strut assembly 20 of the present invention. The frame strut assembly 20 is comprised of a first frame strut 22 and a second frame strut 24, each of which includes a number of generally horizontal frame members 26 that are supported by the generally vertical frame members 28 and the angled frame members 30 welded thereto. The members 30 are angled from a vertical orientation as an accommodation to the shape of the interior walls of van vehicle 10, the upper walls of which are usually sloped slightly inwardly. The frame struts 22 and 24 are designed to be bolted against the interior walls of van vehicle 10, and are removably bolted thereto at the points 32. Also, the frame struts are bolted to the floor of van vehicle 10 at points 34. Further points of attachment may be provided as required by a particular van vehicle for the firm securement of the frame struts 22, 24 therein. This arrangement of frame members forming the frame strut assembly 20 provided oppositely disposed horizontal support members 26 against the interior sides of vehicle 10 running along the length of the vehicle. Also welded to the frame struts 22, 24 are the angularly back support members 36. An extending member 25 is provided to serve as a clothes rack, the member 25 being positioned in close proximity to the doors 18; of course, extending member 25 and other like members may be selectively located as desired.

In near proximity to the frame strut assembly 20 and spaced toward the front of the van vehicle 10 is the base plate 38. The base plate 38 has a flat, planar top surface 40 to which a guide pin 42 is attached. The base plate 38 has four relief notches 44 for a purpose to be described below. The base plate 38 may be made of wood, in which case the top surface 40 may be an abrasive resistive plastic, or a metal plate may be used as the base plate.

FIG. 2 shows the general perspective of the frame strut assembly 20 and the base plate 38 as disposed in the interior compartment 14 of van vehicle 10. To provide a preliminary perspective of the tuility of the frame struts 22 and 24, as applicable herein, FIG. 2 shows the shelf assemblies 50, 52 and 54 supported by the frame struts in a manner and for a purpose to be made clear below.

Figure 3:
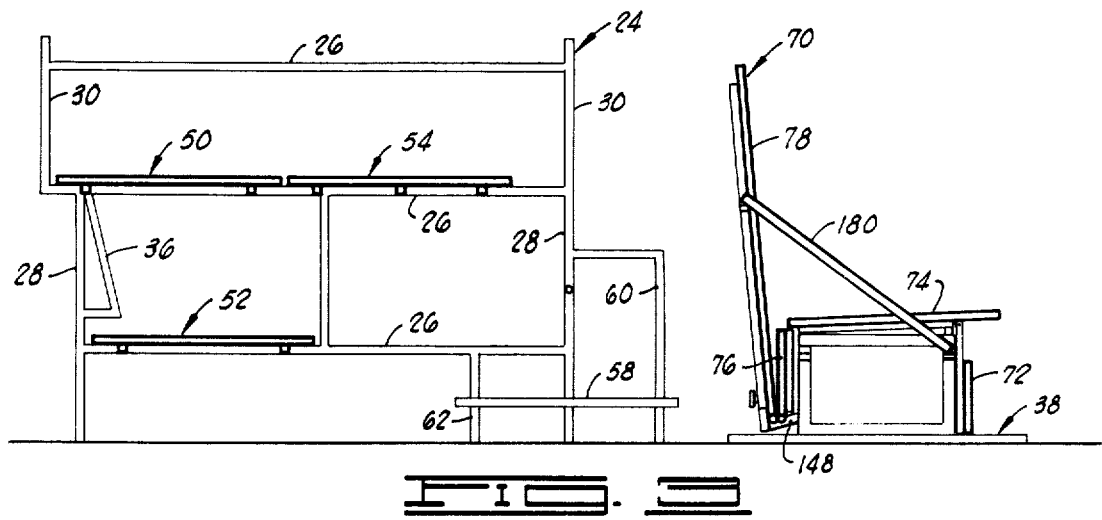
FIG. 3 is a diagrammatical, semi-detailed side view of one of the possible arrangements of the convertible platform and shelf apparatus of the present invention.
Figure 4:
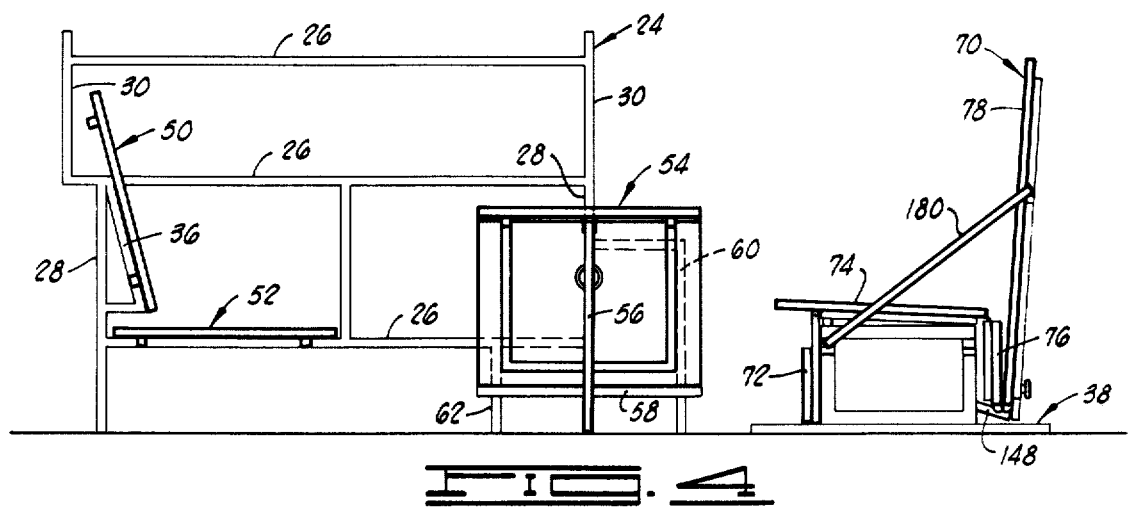
FIG. 4 is a diagrammatical, semi-detailed side view of another arrangement of the convertible platform and shelf apparatus of the present invention.
Figure 5:
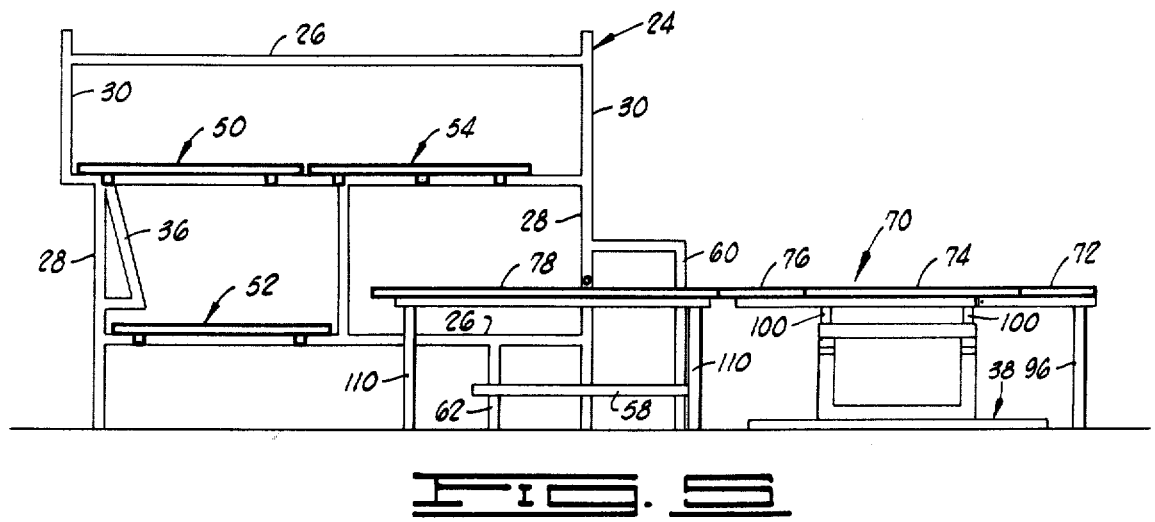
FIG. 5 is a diagrammatical, semi-detailed side view of yet another arrangement of the convertible platform and shelf apparatus of the present invention.

Turning now to FIGS. 3 through FIG. 5, shown therein in semi-diagrammatical detail are various arrangements of the shelf assemblies as used in the present invention. As will be made clear below, the shelf assemblies 50, 52 and 54 are supportable on opposing horizontal, coplanar relationship. The shelf assemblies the second frame strut 24. The side view shown in FIG. 3 shows the shelf assemblies 50, 52 and 54 supported in horizontal, coplanar relataionship. The shelf assemblies 50 and 54 are also in adjacent relationship to form a continuous platform together usable as a bed or the like. The shelf assembly 52 may also be used as a bed, and also is usable as a storage utility area.

In FIG. 4, the shelf assembly 50 is shown supported by the back support members 36. Also, the shelf assembly 54 is shown in a table configuration supported by retractable leg assembly 56, described in more detail below, and by a horizontal member 58 as supported on vertical member 28 as shown in FIG. 2. Additional support struts 60 and 62 are provided in weight support assistance thereof. Although more will be said about the arrangements shown in FIGS. 3 through FIG. 5 below, it should be noted that the present invention contemplates other arrangements of the shelf assembles, such as, but not limited to, the vertical stacking thereof for storage purposes. Further, the number of shelf assemblies and the like is not limited to the illustrations given herein for the purpose of disclosure.

Going now to FIG. 6, shown therein in semi-diagrammatical detail, and in isometric view, is a platform assembly 70 that is positionable in the seat profile shown in FIG. 6 or in a horizontal, coplanar platform profile shown in FIG. 5. As will become clear below, the platform assembly 70, in the seat profile shown in FIG. 6, is positionable in a forward facing profile as shown in FIG. 3, or alternatively, in a reverse facing profile as shown in FIG. 4.

Referring once again to FIG. 6, the platform assembly 70 is comprised of planar section 72, a veneer member 73, planar section 74, planar section 76 and planar section 78 that are hinged together in a manner that will be made clear below. The platform assembly 70 is supported on a seat base assembly 80 that is supported on the top surface 40 of base plate 38.

Going now to the details of platform assembly 70, attention is directed to FIG. 7 which shows a bottom view of the platform assembly. The planar sections 72, 74, 76, and 78 are of rigid product such as pressboard wood or the like. These planar sections are interconnected by the hinges 82, 84 and 86 as shown in FIG. 7, and as will become clear below, each of the planar sections is supported by an underlying metal framework to make each shelf supporting and so that no direct strain is exerted on the planar sections themselves by load bearing thereupon. The planar section 72 has a metal frame 90 having lateral members 92 that extend from the member 90 and connect with each of the hinges 82. A pair of metal plates 94 are securedly attached to the planar section 72 at opposite sides thereof and have connected thereto a pair of retractable legs 96, the legs being of conventional fold up design that need not be described further for purposes of this disclosure, except to say that the legs are of the type that lock into a retract position as shown or into an extend position when extended normal to the planar section 72.

Planar section 74 has a rectangular tubular frame 98 boltingly attached to the planar section and welded to a portion of the hinges 82 and 84 to provide a rigid support thereof. Disposed at the four corners of the rectangular frame 98 are the folded legs 100 that are of conventional design and need not be discussed further for purposes of this disclosure, except to say that they are of a design that affords locking in a retract position or in an extend position.

The planar section 76 has the hinges 86 and the metal frame 102 securedly attached. The metal frame 102 is welded to hinges 84 and is in part comprised of metal plates 104 and 105 for the purpose of serving as a bearing plate for metal support tabs described below. The planar section 78 has a rectangular frame 107 boltingly attached to the planar section, the frame having a cross brace 108. The frame 107 has a pair of supporting tabs 106 attached thereto and extending in contacting relationship with the plates 104 that are secured to the planar section 76 when the planar sections 76 and 78 are in coplanar relationship. Near each of the corners of the rectangular frame 107 is attached a retractable leg member 110 of the same structural design as the leg members 96 previously discussed.

The planar section 72, 74, 76 and 78 are hinged so as to be able to be placed in coplanar relationship as shown in bottom view in FIG. 7, and as shown in FIG. 5 in side view semi-diagrammatical detail. All of the leg members that are secured to the planar sections are retractable so as to allow the platform assembly 70 to be folded flat for storage when removed from the van vehicle 10. When used in the van vehicle 10, the platform assembly 70 is supported on the seat base assembly 80 which is shown in top view in FIG. 8 and in elevational view in FIG. 9.

The seat base assembly 80 is comprised of a box frame 120 that comprises four corner tubular members 122 that are weldingly supported by the top horizontal members 124, the top end members 126, and by similar horizontal bottom members 128 and bottom end members 130. Extending angularly upward at a slight angle from the horizontal and connected to the vertical members 122 are the arm support members 132. The vertical membrs 122 and the arm support members 132 are hollow for the purpose discussed below. Extending normally between and welded to the arm support members 132 are the lift members 133.

Welded to the bottom end members 130 and running the length of the box frame 120 is a guide track member 134 that comprises a pair of spaced apart angle iron members 136 and 138, a cross section of which is shown in FIG. 8A. FIG. 8A shows the guide track 134 with the guide pin 42 in the slot formed between members 136 and 138. Relief notches are formed at the position 40, and these are sized to clearingly release the head 142 of guide pin 42. Stop members 144 are provided across the angle members 136 and 138 to limit the movement of the guide pin 42 within a predetermined travel distance, a feature that prevents the seat base assembly 80 from unnecessarily being pushed into the interior wall when the seat base assembly is being reversed. The support braces 146 are connected between the angle iron members 136 and 138 and the bottom members 128 to provide rigid support for the guide track 134. Also, a pair of slightly downturned brace members 148 are attached to the box frame 120 at the rear portion thereof, the rear portion being defined as that portion which is to support the planar sections 76 and 78 when platform assembly 70 is positioned in the seat profile shown in FIG. 6. The support braces 148 provide additional support to the planar sections 76 and 78 in their orientation shown in FIG. 6. Located at this rear portion of box frame 120 is a pair of vertical support struts 150 connected to the upper and lower horizontal members 124 and 128, and a strut 152 attaches therebetween. A strut 154 having a threaded aperture therethrough is attached to the strut 152 and the respective horizontal member 124. The purpose of the strut 154 and its threaded aperture is to provide a securing means for the planar sections 76 and 78 when positioned in the seat profile as shown in FIG. 6, and an appropriate securing bolt is placed through an appropriately positioned aperture in the planar sections 76 and 78 for threading engagement therewith.

The box frame 120 is paneled with an appropriate veneer material such as a thin plastic or metal sheet 156, portions of which have been shown in cut-away view to show portions of the interior of the box frame 120.

Disposed in vertical orientation in the box frame 120 are four air cylinders 160, the connecting lines of which have not been shown in the figures as these are conventional in structure. The air cylinders 160 each has an extendable ram 162, and are secured to the members 124 and 128 as shown. All of the air cylinders 160 are connected to an external source of compressed fluid such as an air pump for the purpose of causing the arms 162 to extend in unison for the purpose to be made clear below. In order to conserve space, as will become clear below, the rams 162 are caused to pass clearingly through appropriately placed apertures in horizontal members 124.

The seat base assembly 80 is supported on the surface 40 of the base plate 38, and members 166 are hingedly connected to the base plate 38 and connect with appropriately placed threaded apertures in the vertical members 122, or apertured lugs may be attached to members 122 for this connecting purpose. Bolts 168 are then used to pass through the hinged member 166 to secure the seat base assembly 80 to the base plate 38. As shown in FIG. 6, apertures may be placed in the planar sections 72 so that this section is secured by passing the bolts 168 therethrough as the bolts connect the hinges 166 to vertical members 122.

Also disposed in the box frame 120 are two pivotal stay members 170, one of which is shown in the up position in FIG. 9. The stay member 170 is an elongated member pivotally attached at each of its ends to the horizontal members 124 and extends normally therebetween. Stop members 172 are provided at a position along the horizontal members 124 such that the stay member 170 is supported when the stay member is pivoted somewhat past the vertical position, and stp members 173 support the stay member when disposed out of use. The staymembers 170 are provided for a purpose which will be discussed below, and are pivotally disposed below the top surface of the vertical members 122 when not needed.

It should be noted that the box frame 120 of seat base assembly 80 provides a compartment 174. Although not illustrated in the figures, it is within the contemplation of the present invention that a sliding drawer arrangement or the like be disposed within this space. The drawer of conventional structure would slide open from either end and be capable of being locked. This provides a storage space for small articles such as cameras and the like, thus securing such articles in out-of-view placement.

The platform assembly 70 is supported by the seat base assembly 80 as the legs 100 are slidingly placed in the hollow vertical members 122 of box frame 120. The legs 100 are sized so as to be shorter than the length of the vertical members 122, and serve as vertical guiding members for the planar section 74. When the platform assembly 70 is positioned in the profile of a seat as in FIG. 6, the planar section 74 rests upon the vertical members 122. To hold the planar section 78 in angular disposition as shown in FIG. 6, arm members are provided, two types of which are shown in FIG. 6 as 180 and 182, shown respectively in FIGS. 10 and 11.

The arm member 180 comprises a tubular elongated member 181 having end tubular members 184 that are angularly connected to the member 181 as shown in the cross sectional view of FIG. 10A taken at 10A—10A in FIG. 10. Further structure of the platform assembly 70 comprises a pair of hollow tubular member 186 that are welded to the frame 107 attached to the planar section 78, and extend at a slight angle thereto. Returning to FIG. 10, the members 184 are sized to be received by the hollow of the angled members 132 extending from the box frame 120 and the angle members 186 extending from the frame 107 attached to planar section 78. The placement of the arm member 180 in the manner described and shown in FIG. 6 secures the planar section 78 in a generally upright position as shown therein. While a second arm member 180 may be used at the opposite end of the platform assembly 70 in precisely the same manner as described for the arm member 180 illustrated in FIG. 6, the different type of arm structure 182 is shown therein for illustration purposes.

Referring to FIG. 11, the arm member 182 consists of an elongated member 188 attached to normally extending members 190. Connected to the distal end of member 188 in angular fashion is the member 194, shown best in the cross sectional view taken at 11A—11A in FIG. 11, and shown in FIG. 11A. The member 194 is sized to be slidingly pressed into the hollow of member 186 extending from frame 107 of planar section 78. Also, angularly extending from the lower ends of the members 190 are the members 196 which are receivable in the hollow of members 132 extending from the box frame 120. When positioned relative to the planar section 78 and the seat base assembly 80 as shown in FIG. 6, the arm member 182 serves to secure the planar section in a generally vertically angled orientation as shown in FIG. 6. The lift members 133 that extend between angular members 132 are for the principal purpose of manually lifting the seat base and planar section 70 off of the base plate, and also for gripping handle while pivoting the seat base on the base plate.

The platform assembly 70 is shown in its platform mode of profile in FIG. 5, wherein all of the planar sections 72, 74, 76 and 78 are positioned in rigid coplanar relationship, the retractable legs 110 and 96 being extended in support thereof. It should be noted that the platform sections are elevated relative to the seat base assembly 80. In achieving this raised position of the planar sections, the air cylinders 160 are actuated by means of a source of compressed air to extend the rams 162 against the underside of planar section 74 whereupon the planar section 74 is raised. The stay members 170 are then positioned beneath the planar section 74 to provide support therefor.

Turning now to FIG. 12, shown therein is the underside of the shelf assembly 54. While the shelf assembly 54 will be described, it should be noted that the shelf assemblies 50 and 52 are nearly identical with the shelf assembly 54. Therefore, a description of the shelf assembly 54, along with a discussion of the differences of the shelf assemblies 50 and 52 thereto, will be sufficient for purposes of disclosure herein. The shelf assembly 54 is comprised of a first planar member 200 and a second planar member 202 hinged thereto via hinges 204, the planar members placed in end to end relationship. Although many materials of construction may be used for planar members 200 and 202, a pressboard product or the like has been found to be satisfactory. Bolted to the underside 206 of first planer member 200 is the rectangular frame 208. Welded to the frame members 210 of the frame 208 are the in line guide members 212, these guide members being paired to slidingly retain an elongated extension member 214 that has a strut member 216 welded therebetween.

The second planar member 202 has a frame 220 boltingly attached to the underside thereof. The frame 220 has a pair of hollow side members 222 that are spaced to receive the extending ends of the extending members 214 in sliding and locking engagement thereof. When the second planar member 202 is placed in coplanar relationships with the first planar member 200, the extending members 214 may be moved, by pushing on the strut 216, into sliding and locking engagement with the side members 222 by action of the extending member 214 extendingly engaging the hollow side members 222.

As will be understood by referring to the previous Figures, the shelf assembly 54 may be supported by the frame strut assembly 20 by supporting the shelf assembly 54 on opposing horizontal frame members 26. It will be clear that when this is the position desired of the shelf assembly 54, the first and second planar members 200 and 202 are placed in rigid coplanar relationship as above described. To secure the shelf assembly 54 to the horizontal frame members 26, a pair of pins 230 extend from the end members 232 and 234 respectively of the frames 208 and 220. Appropriately placed apertures in the horizontal frame members 26 clearingly receive the pins 230. To securely install the shelf assembly 54 on the horizontal frame member 26, the shelf assembly 54 is first unlocked from its rigid coplanar relationship of the first and second planar members 200 and 202, pivoted along hinges 204 and one set of the pins 230 is placed in the apertures in the appropriate frame member 26, after which the other set (that is, on the other end of the shelf assembly 54) is started into the apertures in the opposing horizontal frame member 26. The planar members are then pivoted about hinges 204 into coplanar relationship, and the strut 216 pushes so as to cause the extending members 214 to come into locking engagement with the hollow members 222.

As shown in FIG. 4, the shelf assembly 54 may also be set up in a table profile or mode. For this purpose, a retractable leg assembly 56 is provided, the length of the leg being predetermined for the desired table height. The shelf assembly 54 is supported in the table profile shown in FIGS. 2 and 4 by placing the edge 238 of the second planar member 202 supportingly onto the horizontal support member 58, and by extending the leg assembly 56. Stability is provided by the placement of an aperture 236 generally through the center of the planar member 202, providing an appropriately placed threaded aperture in the respective vertical frame member 28, and providing bolt means for securing the second planar member 202 generally vertically as shown.

Turning now to the shelf assembly 52, this shelf assembly may be constructed identically to the shelf assembly 54 above described. It may be desirable, however, to eliminate the leg assembly 56 therefrom if shelf assembly 52 is not to be used in the table profile. It is clear that the leg assembly 56 is unnecessary if shelf assembly 52 is only used in the horizontal utility storage area profile shown in the figures. Although not shown in the figures, an alternative structure is the provision of double leg assemblies (of like design to leg assembly 56 or otherwise) on each end of the shelf assemblies 52 and 54 to enable the shelf assemblies to free stand when removed from van vehicle 10, whereupon the shelf assemblies are usable as independent tables, cots or the like.

As to shelf assembly 50, it is used in the utility area shown in FIG. 3, and as a back support in cooperation with the shelf assembly 52 to form a seat therewith, as shown in FIG. 4. While the construction of shelf assembly 50 is substantially the same as discussed for shelf assembly 54, it has been found that appropriately placed notches in the outboard end of the first and second planar members are necessary to provide clearance to the horizontal frame members 26. Also, depending upon the shape of the interior walls of van vehicle 10, it may be necessary to relieve the upper outside corners of the frame assembly 50 to accommodate the inward curve of the interior walls. Depending upon the utiliztion of shelf assembly 50, a leg assembly 56 may or may not be required.

Operation of the Preferred Embodiment

The general operation of the apparatus of the present invention has been made clear by the discussion of the detailed construction given above for purposes of disclosure. It is only desirable in completing the discussion herein to describe the pivoting of platform assembly 70 when utilized in the seat profile as shown in FIG. 3 and 4. Otherwise, the setting up of shelf assemblies 50, 52 and 54 has been made clear from the above discussion, as has been the setting up of the platform assembly 70 in the platform profile shown in FIG. 5.

It should be pointed out that the seat base assembly 80 has been made to slide upon the top surface 40 of the base plate 38. The guide pin 42 has been made to be slidingly engaged by the guide track 134 during the sliding movement of the seat base assembly 80. Of course, the notch at point 140 allows the complete removal of the guide pin from the guide track 134 and consquently, the removal of platform assembly 70 from vehicle 10. To reverse the seat from the position shown in FIG. 3 to that shown in FIG. 4, it is only necessary to disconnect the hinges 166 from bolting engagement with seat base assembly 80, and to pivot the seat base assembly 80 about guide pin 42. There is generally not enough room in a van vehicle 10 to pivot the seat base assembly 80 about the guide pin 42 in a circular path. That is, it is necessary to turn the seat base assembly 80 about the guide pin 42 while sliding the seat base assembly along the guide pin. This shortens the center of pivotation and allows the seat base assembly to be pivoted with very little clearance space thereabout. Once the platform assembly 70 has been reoriented (that is, turned around) the seat base assembly 80 is once again bolted to the base plate 38 by appropriate bolting means through the hinges 166.

The convertible vehicle platform and shelf apparatus of the present invention has been necessarily illustrated free of upholstering apointments in order to show the functional operation thereof. It is within the contemplation of this invention that upholstering be provided of the type that will provide a very pleasing interior setting, while at the same time maintain the convertibility and adaptability of the present invention. For example, removable pads are contemplated for utilization on the utility areas provided by the shelf assemblies 50, 52 and 54. Furthermore, it will be clear that ample padding will be necessary to provide comfortable seating for the platform assembly 70 when in the seating profile shown in FIGS. 3 and 4, and that suitable padding to provide a comfortable bed or the like will be desirable for the platform assembly 70 when utilized in the platform profile as shown in FIG. 5.

It is also clear that the utility areas provided by the embodiment described herein may be altered in a way to provide individually desired utility areas. Therefore, the present invention is not limited to the arrangements shown in the figures.

It is clear that the present invention is well adapted to carry out the objects and attain the ends and advantages mentioned as well as those inherent therein. While a presently preferred embodiment of the invention has been described for purposes of this disclosure, numerous changes may be made which will readily suggest themselves to those skilled in the art and which are encompassed within the spirit of the invention disclosed and as defined in the appended claims.

What is claimed is:

1. A convertible platform and shelf apparatus for a van vehicle or the like having interior sides and a floor, comprising:
   a frame strut assembly connectable to the interior sides of the vehicle on opposite sides thereof;
   a first shelf member detachably connectable to the frame strut assembly and extending transversely to the vehicle, the first shelf member characterized as comprising:
      a first planar member;
      a second planar member pivotally connected to the first planar member, the first and second planar members selectively positionable in a first mode wherein the planar members are in rigid coplanar relationship and in a second mode wherein the first and second planar members are angularly disposed to each other;
      retractable leg means connected to the first planar member for selectively supporting the first planar member;

a second shelf member detachably connectable to the frame strut assembly and extending transversely to the vehicle, the first shelf member characterized as comprising:

a first planar member;

a second planar member pivotally connected to the first planar member, the planar members positionable in a first mode wherein the planar members are in rigid coplanar relationship, the second shelf member selectively connectable to the frame strut assembly at an angle to the horizontal, the first shelf member and the second shelf member selectively cooperating to form a seat;

a base plate connectable to the floor of the vehicle, the base plate having a top surface;

a guide pin connected to the top surface of the base plate generally in the center of the base plate;

a seat base assembly slidably supported by the base plate and characterized as comprising a box frame having a guide pin being receivable and slidably retainably by the guide pin track; and platform means connectable to the seat base assembly for selectively forming a seat or a platform.

2. The apparatus of claim 1 wherein the platform means comprises:

a platform assembly supported by the seat base assembly comprising a plurality of planar sections pivotally interconnected and selectively positionable in rigid coplanar relationship.

3. The apparatus of claim 2 further comprising:

lift means disposed in the seat base assembly for selectively raising and positioning the platform assembly in a raised position relative to the seat base assembly.

4. The apparatus of claim 3 wherein the lift means comprises:

a compressed fluid cyclinder having one end supported by the seat base assembly and having the other end thereof liftingly engagable with the platform assembly; and an adjustable stay member supported by the seat base assembly and selectively positionable to support the platform assembly in the raised position.

5. In combination, a vertically disposed frame strut assembly comprising a plurality of generally horizontal support members; a first platform member having hinged planar sections positionable in a first coplanar mode and in a second non-coplanar mode, the first platform detachably supportable by the horizontal support members; a base plate disposed in close proximity to the frame strut assembly and having a top surface portion thereof; a guide pin attached to the top surface of the base plate; a seat base assembly having a guide track slidably and pivotally connected to the guide pin, the seat base assembly supported by the top surface of the base plate; a platform assembly supported by the seat base assembly comprising a plurality of hingedly connected planar sections positionable in a first coplanar mode and in a second seat profile mode; and lift means for selectively raising the platform to a raised position relative to the seat base assembly.

6. The combination of claim 5 wherein the frame strut assembly further comprises back support members and the combination further comprising a second platform member having hinged planar sections positionable in a rigid coplanar mode and supportable to the back support members.

7. The combination of claim 6 wherein the lift means comprises:

a compressed fluid cylinder having one end supported by the seat base assembly and having the other end thereof liftingly engageable with the platform assembly; and an adjustable stay member supported by the seat base assembly and selectively positionable to support the platform assembly in the raised position.

8. A convertible vehicle platform and shelf apparatus for a van truck or the like having an interior compartment comprising:

a frame strut assembly connectable to the interior sides of the compartment on opposite sides thereof;

a plurality of platform members each comprising a plurality of planar members hingedly connected in side juxtaposition and selectively positionable in rigid coplanar relationship to each other, each platform member detachably connectable to the frame strut assembly;

a base plate connectable to the floor of the vehicle and having a top surface;

a guide pin attached to the top surface of the base plate;

a seat base assembly slidably supported by the top surface of the base plate and having a guide pin track in slidable and pivotal engagement with a portion of the guide pin; and platform means connectable to the seat base assembly for selectively forming a seat or a platform.

9. A convertible platform and shelf apparatus for a van like vehicle having an interior compartment, comprising:

a frame strut assembly connected to the interior walls of the compartment on opposite sides thereof;

a plurality of platform members each comprising two planar sections connected for hinged pivotation and a selectively positionable and rigid coplanar relationship to each other, the platform members detachably connectable to the frame strut assembly, at least one of the platform members having a retractable support leg selectively extendable to a predetermined length to reach from the platform member to the floor when the platform member is connected to the frame strut assembly;

a base plate connected to the floor of the compartment and having a top surface;

a guide pin connected to the top surface of the base plate generally in the center of the base plate, the guide plate having a head;

a seat base assembly comprising:

a box frame having a top and a bottom;

a guide pin track connected to the box frame near the bottom thereof and extending along the bottom of the box frame, the bottom of the box frame slidably supported on the top surface of the base plate, the guide pin head retainingly receivable by the guide pin track and the guide pin track slidable and pivotal on the guide pin for guiding movement of the box frame on the base plate; and, locking means for securedly connecting the seat base assembly to the base plate; and, platform means connectable to the seat base assembly for selectively forming a seat for a horizontal platform.

\* \* \* \* \*